United States Patent [19]
Lennox et al.

[11] Patent Number: 6,137,419
[45] Date of Patent: Oct. 24, 2000

[54] PICKUP TRUCK TAILGATE MONITOR

[76] Inventors: Christina M. Lennox; Bradford M. Lennox, both of 8217 State Rd., Goodrich, Mich. 48438; Paul J. Huber, 6051 Thomas St., Davison, Mich. 48423

[21] Appl. No.: 09/468,195

[22] Filed: Dec. 21, 1999

[51] Int. Cl.⁷ .................................................. G08B 21/00
[52] U.S. Cl. ...................... 340/687; 340/457; 340/468; 116/35 R
[58] Field of Search ................................... 340/687, 457, 340/468

[56] References Cited

U.S. PATENT DOCUMENTS

| | | |
|---|---|---|
| 1,299,979 | 4/1919 | Malburg . |
| 2,576,017 | 11/1951 | Jeffrey et al. . |
| 3,697,943 | 10/1972 | Andres . |
| 3,789,357 | 1/1974 | Fritz, Jr. . |
| 3,883,844 | 5/1975 | Wood, II . |
| 3,924,558 | 12/1975 | Di Grazia . |
| 4,249,161 | 2/1981 | Mohnhaupt . |
| 4,652,768 | 3/1987 | Gmeiner . |
| 5,121,098 | 6/1992 | Chen . |
| 5,289,534 | 2/1994 | Lester et al. . |
| 5,563,483 | 10/1996 | Kowell et al. . |
| 5,602,526 | 2/1997 | Read . |
| 5,656,990 | 8/1997 | Schwimmer . |
| 5,708,409 | 1/1998 | Schwimmer et al. . |
| 5,713,621 | 2/1998 | Krenkel et al. . |
| 5,828,299 | 10/1998 | Chen ....................................... 340/468 |
| 6,065,423 | 5/2000 | Hansel .................... 116/35 R |

*Primary Examiner*—Daniel J. Wu
*Assistant Examiner*—Tai T. Nguyen
*Attorney, Agent, or Firm*—Reising, Ethington, Barnes, Kisselle, Learman & McCulloch, P.C.

[57] ABSTRACT

The pickup truck tailgate monitor includes a control panel mounted adjacent to an operator station in the cab of the truck. The control panel is connected to the master switch for the vehicle. A monitor switch on the control panel is closed to activate the monitor. If the monitor is operational, an indicator light of a first circuit is illuminated. A second circuit with an audible indicator is energized by a sensor switch that is closed. The sensor switch is closed when the tailgate is open. When the tailgate is closed, the sensor switch is open.

8 Claims, 2 Drawing Sheets

PICKUP TRUCK TAILGATE MONITOR

TECHNICAL FIELD

This invention relates to a pickup truck tailgate monitor and more particularly to a monitor that warns the driver of a pickup truck if the tailgate if left open or if the tailgate opens while the truck is moving. The disclosure incorporates the pickup truck tailgate monitor disclosed in provisional patent application Ser. No. 60/113,741, filed Dec. 23, 1998, whose priority is claimed for this application.

BACKGROUND OF THE INVENTION

Pickup trucks manufactured some years ago have tailgate latch systems that can be visually inspected to determine if the tailgate is locked in a closed position. These latching systems include a hook on a chain that is inserted through aligned apertures in two plates that are adjacent to each other when the tailgate is closed. The chain and hook are outside the cargo area, where they can be observed from a distance. A chain and hook was provided for locking each side of the tailgate in the closed position.

The employment of two chain and hook latches made it somewhat inconvenient to open and close tailgates with the chain and hook latch systems. Manufacturers of pickup trucks introduced tailgate latch systems with a centered latch handle to eliminate the chains and hooks. The centered latch handle makes it convenient and easy to open and close a tailgate in one location.

The centered latch handles, that are employed on pickup trucks manufactured today, offer a variety of latch systems. Some of the latch systems have a latch bar on each side of the tailgate that slides laterally in to and out of a receiver. Other centered latch handles operate a forked latch plate that engages a fixed pin at each side of the cargo box of the truck. The forked latch plates rotate about a fixed transverse horizontal axis. The center latch handle frees the forked latch plates to rotate and allows the tailgate to open.

A latch system operated by a centered latch handle is hidden from view when the tailgate is in a closed position. The centered latch handle can be seen but the latch bars, forked latch plates, or other latching members are hidden from view. The linkage connected to the centered latch handle is enclosed inside the tailgate.

Owners and operators of pickup trucks with enclosed tailgate latching systems have, until recent years, generally been able to grasp tailgates and pull on them to determine if they are actually latched in the closed position. Owners and operators have also been able to observe tailgates from inside the operator's compartment to visually determine if the tailgate is closed.

Owners and operators of pickup trucks today frequently use them in place of cars. For such use, an enclosed cargo compartment is required to serve the function of an automobile trunk. A variety of covers are used to protect articles carried in pickup truck boxes from the elements. Some of these covers include soft fabric material, while others are made from rigid materials. Regardless of the material used to make these covers, many of them have two characteristics that cause problems. They cover the upper edge of the tailgate making it impossible to grasp and pull on the tailgate to ensure that it is latched in a closed position. Many of these covers also block the view of the tailgate from the operator's compartment. As a result, tailgates on pickup trucks occasionally open while the truck is in motion and cargo is lost on the road.

SUMMARY OF THE INVENTION

An object of the invention is to provide a tailgate monitor in the operator's compartment of a pickup that provides a warning if the tailgate is open. Another object of the invention is to provide a monitor that alerts the driver if the tailgate comes open while the truck is moving. A further object of the invention is to provide a tailgate monitor that can be deactivated when transporting long cargo with the tailgate open. A still further object of the invention is to provide a tailgate monitor with an indicator that indicates when the monitor is in operation. A yet still further object of the invention is to provide a tailgate monitor that can be installed on existing pickup trucks.

The tailgate monitor includes a sensor that senses when the tailgate is open. The sensor is connected to a circuit which activates an electronic buzzer when the tailgate is open. A switch in the operator's cab allows the operator to turn off the tailgate monitor system, including the electronic buzzer when transporting elongated cargo with the tailgate open. A light is provided on the monitor control panel near the operator's station to indicate that the tailgate monitor is turned on and functioning when the tailgate is not intentionally left in an open position.

BRIEF DESCRIPTION OF THE DRAWINGS

The presently preferred embodiment of the invention is disclosed in the following description and in the accompanying drawings, wherein.

DETAILED DESCRIPTION OF THE PREFERRED EMBODIMENT

Figure 1:
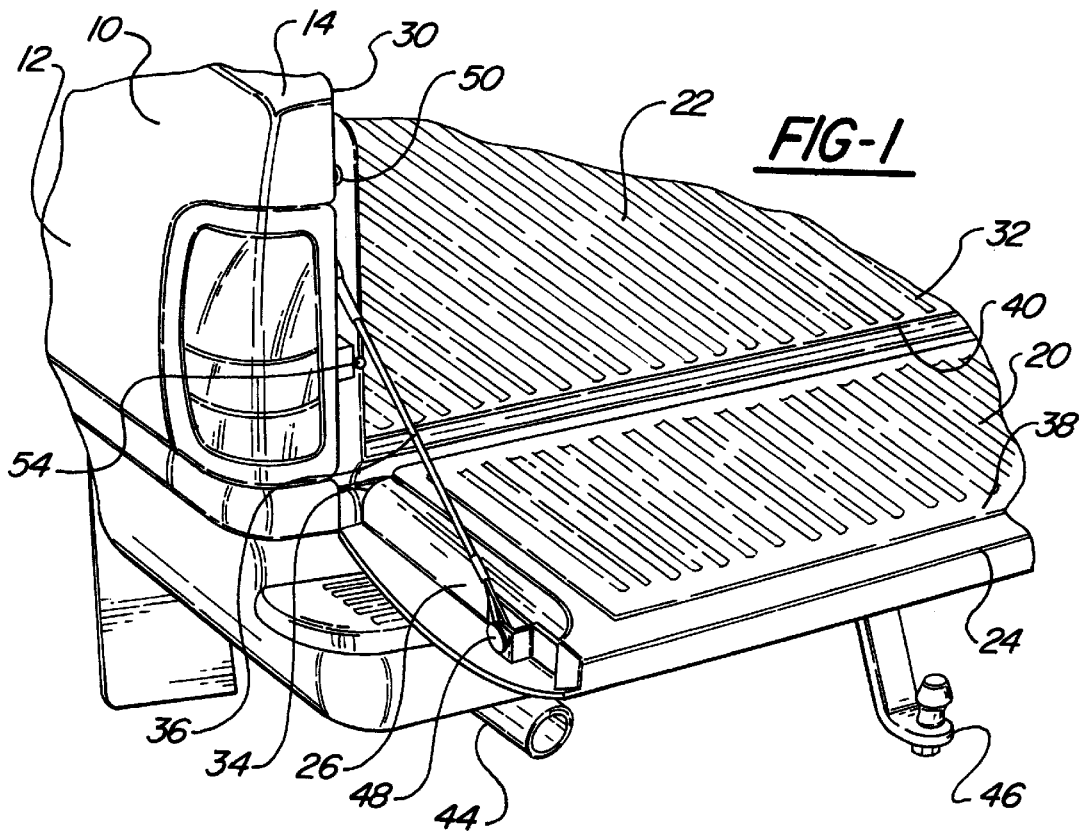
FIG. 1 is a perspective view of the back of the pickup truck with the tailgate open and showing a tailgate sensor switch.
Figure 2:
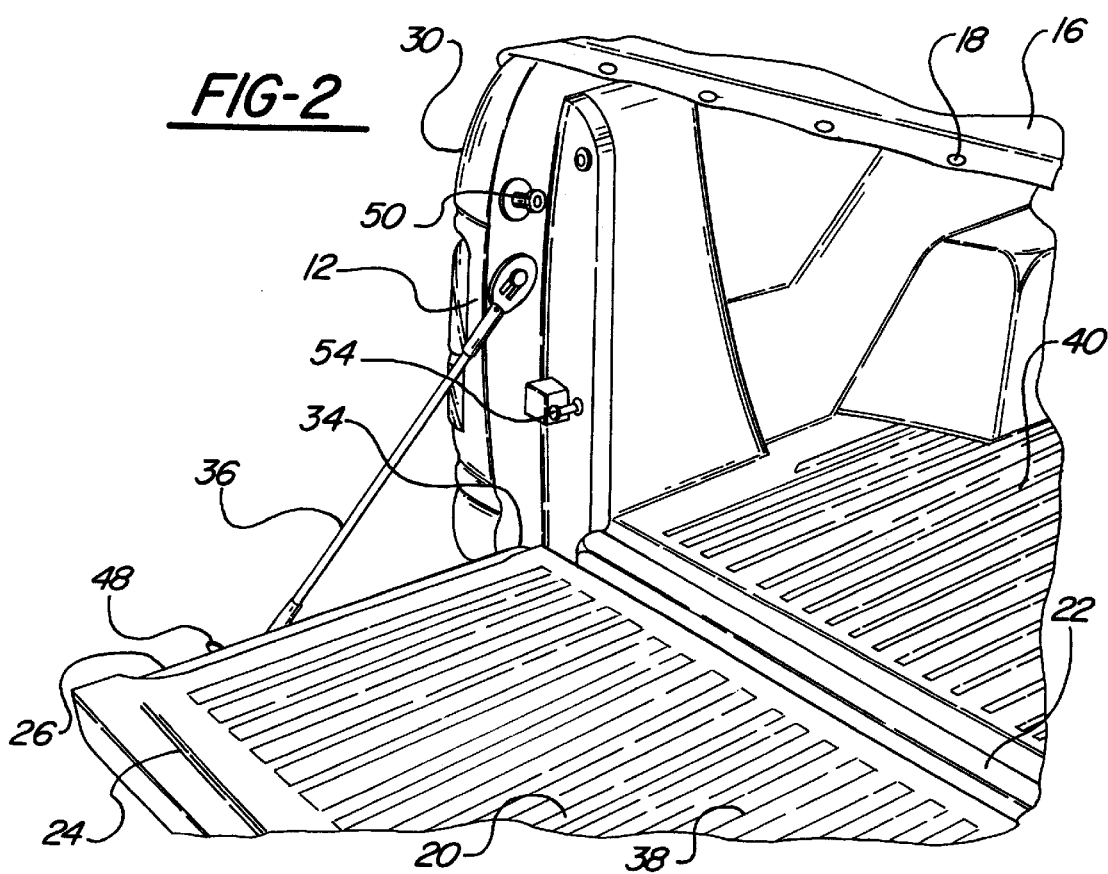
FIG. 2 is a perspective view of the back of a pickup truck with an open tailgate and a tailgate sensor switch.
Figure 3:
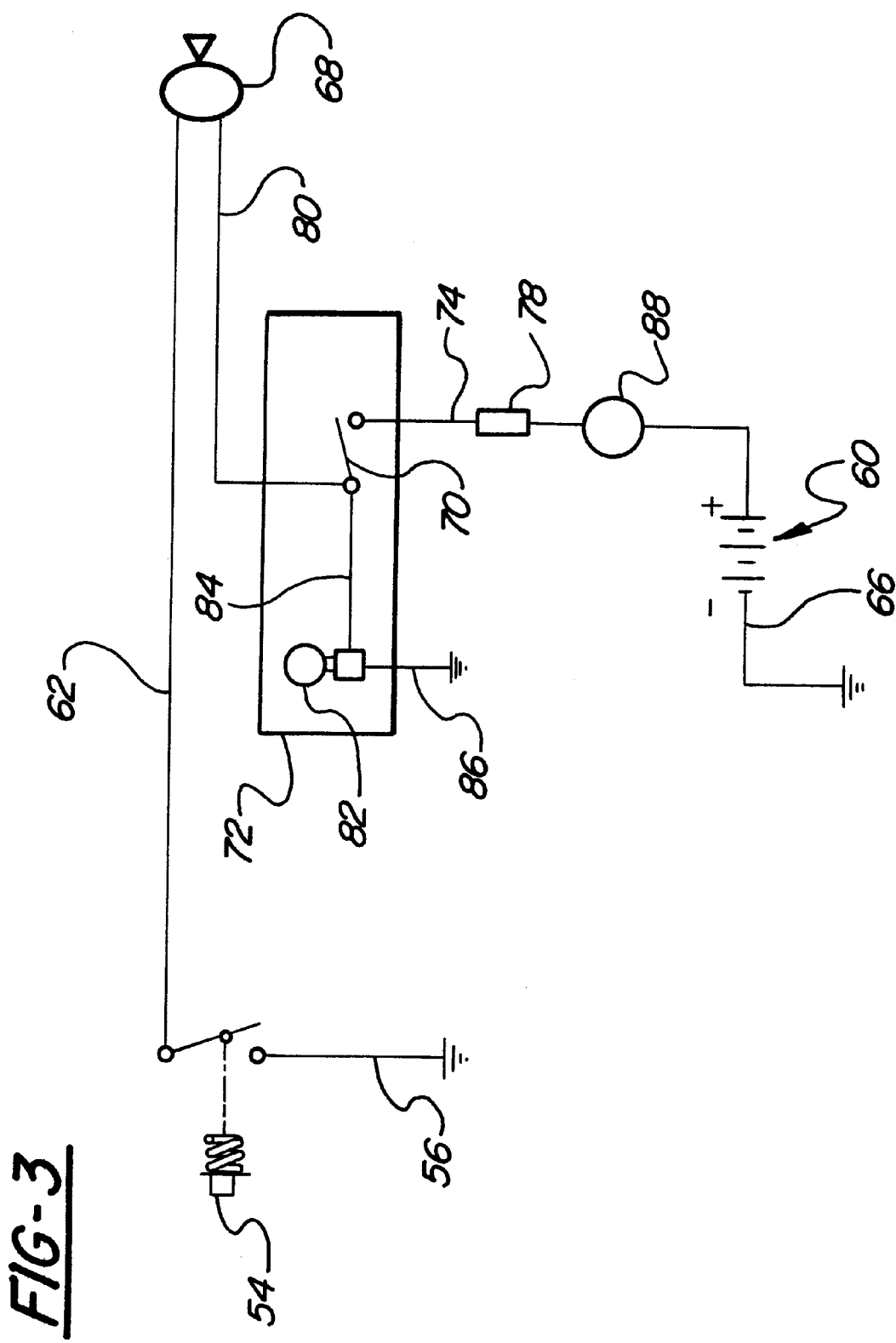
FIG. 3 is a circuit diagram of the tailgate monitor.

The pickup truck 10, as shown in FIGS. 1 and 2, has a standard pickup box 12 with an open top 14. The open top 14, as shown, is covered by a cover 16. The cover 16 shown in the drawing is a soft waterproof fabric attached to a metal frame by snaps 18. The metal frame is not shown in the drawing. Metal covers of various designs, as well as rigid plastic covers are also available. Some of these covers can be easily opened and closed to place cargo in or take cargo from the box 12.

The tailgate 20 has a bottom edge 22, a top edge 24, a left edge 26, and a right edge 28. The bottom edge 22 is pivotally attached to the left side 30 and the right side 32 of the box 12 by hinge members 34. When the tailgate 20 is open as shown in FIG. 2, a cable 36 attached to the left side 30 of the box 12 and the left edge 26 near the top edge 24 holds the inside surface 38 of the tailgate in a common plane with the floor 40 of the box. A second cable 42, that is identical to the first cable 36, is attached to the right side 32 and the right edge 28. The cables 36 and 42 support the tailgate 20 so that long cargo can be supported for transport by the tailgate's inside surface 38 as well as the floor 40. The cables 36 and 42 also keep the tailgate 20 from contacting a bumper 44, a trailer hitch 46 or other structures that could cause damage.

The tailgate 20 is closed by lifting the top edge 24 and pivoting the tailgate about a horizontal axis transverse to the direction of movement of the pickup truck 10 formed by the hinge members 34. As the tailgate 20 reaches a closed position, forked latch plates 48, that are pivotally secured to the left and right edges 26 and 28 of the tailgate 20 strike the fixed pins 50 and 52 attached to the left side wall 30 and the right side wall 32. Striking the fixed pins 50 and 52 rotates the latch plates 48 into a closed position in which the tailgate 20 is held closed and a lock mechanism limits rotation of the latch plates. The top edge 24 is under the rear edge of the cover 16 when the tailgate 20 is in the closed position.

Occasionally a tailgate 20 fails to fully latch in the closed position. The operator of the pickup truck 10 cannot easily determine if the tailgate 20 is fully latched in a closed position. If the tailgate 20 is not fully latched, as occasionally happens, it may drop open when the truck 10 accelerates or hits a bump. After the tailgate 20 opens, cargo in the box 12 can be lost. With the cover 16 or a similar cover, the operator of the truck 10 cannot see the tailgate 20 from the operator's station to determine if the tailgate is open or closed.

A sensor 54 is mounted on the left side 30 of the box 12 where it is contacted by the tailgate 20 when the tailgate is in a closed position. The sensor 54 is a switch that is open when in contact with the tailgate 20 and closed when the tailgate is open. The sensor 54 has a first lead 56 connected to the frame 58 of the truck 10 and the negative terminal 66 on the battery 60. The first lead 56 of the sensor 54 may be the sensor housing. The second lead 62 of the sensor 54 is connected to an electronic buzzer 68 in the cab 64 of the truck 10. An on and off switch 70 on the tailgate monitor control panel 72 has one lead 74 connected to the positive terminal 76 of the battery 60 through a fuse 78. The other terminal of the switch 70 is connected to the electronic buzzer 68 by a lead 80 and to the light 82 by a lead 84. The light 82 is also connected to the frame and the negative terminal 66 on the battery 60 by a lead 86.

When the switch 70 is in the off position, there is an open circuit and no current is supplied to the light 82 or the electronic buzzer 68. Moving the switch 70 to an on position connects the light 82 to the positive terminal 76. This energizes the light 82 and indicates to the operator of the truck 10 that the tailgate monitor system is operating. Moving the switch 70 to an on position also connects the electronic buzzer 68 to the positive terminal 76 on the battery 60. The buzzer 68 will then be energized and generate sound any time the sensor 54 is in a closed position. When the sensor 54 is open, the buzzer 68 is not connected to the negative terminal 66 of the battery 60 and will not make a sound. The buzzer 68 will generate a sound any time the switch 70 is on and the sensor 54 senses that the tailgate 20 is open. The buzzer 68 will not generate a sound any time the sensor 54 senses that the tailgate 20 is closed or the switch 70 is off.

The tailgate monitor is preferably connected to the positive terminal 76 of the battery 60 through the ignition switch 88 of the truck 10 so that the switch 70 is disconnected from the battery when the ignition switch is turned off. This ensures that the light 82 is not left on when the truck is parked.

During operation of the pickup truck tailgate monitor, the operator preferably turns the truck ignition switch 88 on to connect the switch 70 to the battery 60. The switch 70 is then turned on. If the buzzer 68 sounds, the tailgate 20 is open. The operator can close the tailgate 20 to turn the buzzer 68 off or if overlength cargo is in the box 12 and the tailgate is to remain open, the switch 70 can be turned off, thereby turning the buzzer off. If the monitor switch 70 is on when the ignition switch 88 is turned on, the step of turning the monitor switch on can be skipped and operation will proceed as set forth above.

It is to be understood that other embodiments of the invention which accomplish the same function are incorporated herein within the scope of any ultimately allowed patent claims.

I claim:

1. A pickup truck tailgate monitor for monitoring a position of a tailgate that is pivotally attached to a rear portion of a truck cargo container for pivotal movement about a generally horizontal axis that is below a cargo container floor comprising:

a storage battery;

an accessory switch connected to the storage battery;

a control panel switch in series with the accessory switch;

a first control circuit including a first indicator in series with the accessory switch and the control panel switch; and a second control circuit in parallel with the first control circuit and including a second indicator in series with a tailgate position sensor switch that is open when the tailgate is in a closed position and that is closed when the tailgate is pivoted out of the closed position.

2. A pickup truck tailgate monitor as set forth in claim 1 wherein the first indicator is a light.

3. A pickup truck tailgate monitor as set forth in claim 1 wherein the second indicator is an audible indicator.

4. A pickup truck tailgate monitor as set forth in claim 1 wherein the first indicator is a light that is illuminated when the accessory switch is closed and the control panel switch is closed, and the second indicator is energized and produces an audible signal when the first indicator is illuminated, the tailgate position sensor switch is closed and the tailgate is open.

5. A pickup truck tailgate monitor for monitoring the position of a tailgate that is pivotally attached to a rear portion of a truck cargo container for pivotal movement about a generally horizontal axis that is below a cargo container floor comprising:

a vehicle ignition switch connecting vehicle components and accessories to an electrical storage battery;

a monitor control panel connected to the ignition switch and energized by the battery when the ignition switch is in an on position;

a control panel switch mounted on the control panel and connected to the ignition switch;

a first control panel circuit connected to the control panel switch and including an indicator light that is energized anytime the ignition switch is in the on position and a control panel switch is closed;

a second control panel circuit connected to the control panel switch and including an electronic buzzer in series with a tailgate position sensor and wherein the tailgate position sensor is mounted on a fixed tailgate frame and has a plunger in the path of movement of the tailgate that opens the second control panel circuit when the tailgate is in a closed position, and that closes the second control panel circuit and activates the electronic buzzer anytime the tailgate is out of the closed position and the first control panel circuit is energized.

6. A pickup truck tailgate monitor as set forth in claim 5 wherein the tailgate position sensor is mounted on the fixed tailgate frame above the generally horizontal axis and has a sensor body that is inside the frame where it is protected and outside the cargo area of the truck cargo container.

7. A pickup truck tailgate monitor as set forth in claim 5 wherein the indicator light is mounted inside an operators cab of said pickup truck and the electronic buzzer is mounted inside the operators cab of said pickup truck.

8. A method of monitoring the position of a tailgate on a pickup truck from a cab of the pickup truck comprising:

switching an accessory switch to a closed position;

switching a control panel switch to a closed position;

illuminating a first indicator light to indicate that a monitor circuit is energized; and energizing an audible indicator when the tailgate is in an open position.

* * * * *